July 31, 1923.
C. H. WEISKOPF
1,463,352
APPARATUS FOR THE ELECTRICAL PRECIPITATION OF SUSPENDED PARTICLES FROM GASES
Filed Sept. 19, 1921
5 Sheets-Sheet 3
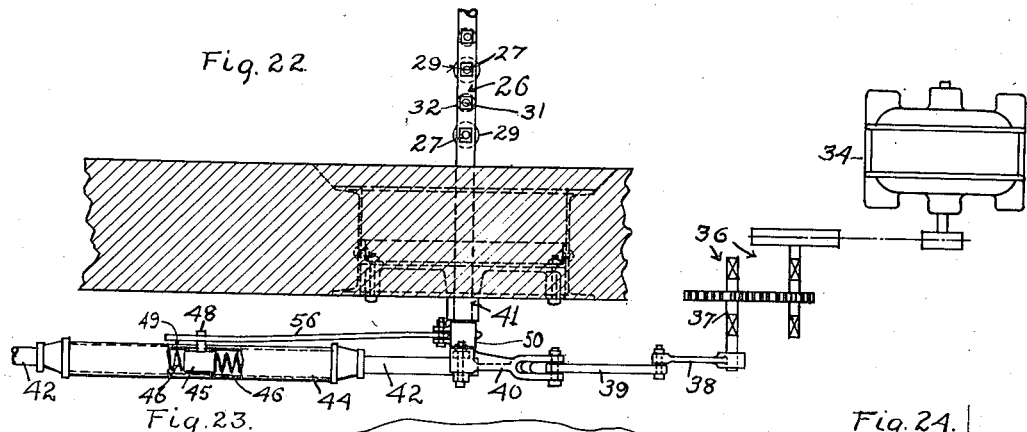
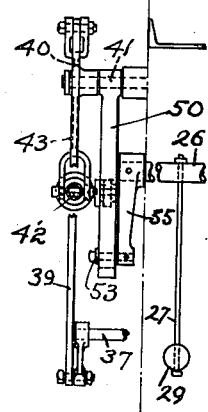
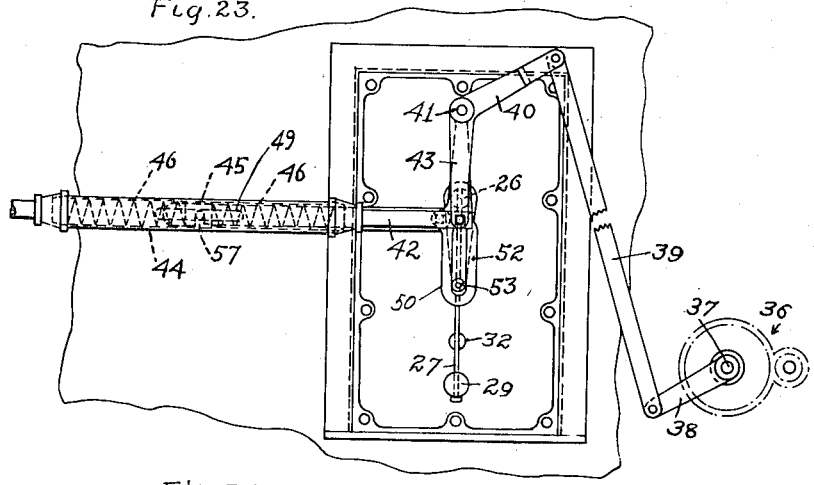
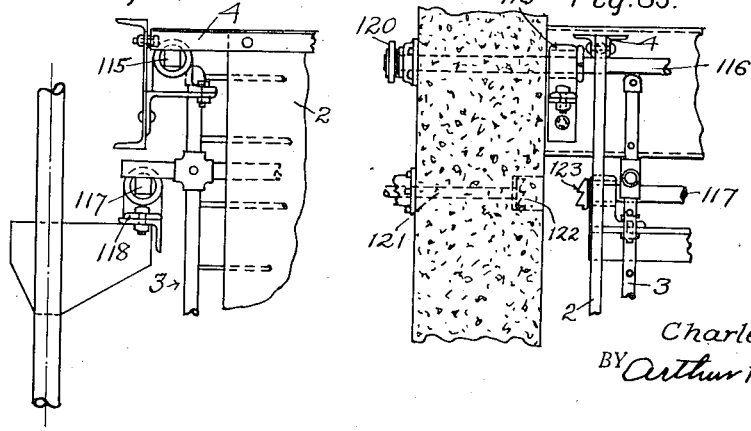
INVENTOR.
Charles H. Weiskopf
BY Arthur P. Knight
ATTORNEY July 31, 1923.
C. H. WEISKOPF
1,463,352
APPARATUS FOR THE ELECTRICAL PRECIPITATION OF SUSPENDED PARTICLES FROM GASES
Filed Sept. 19, 1921
5 Sheets-Sheet 4
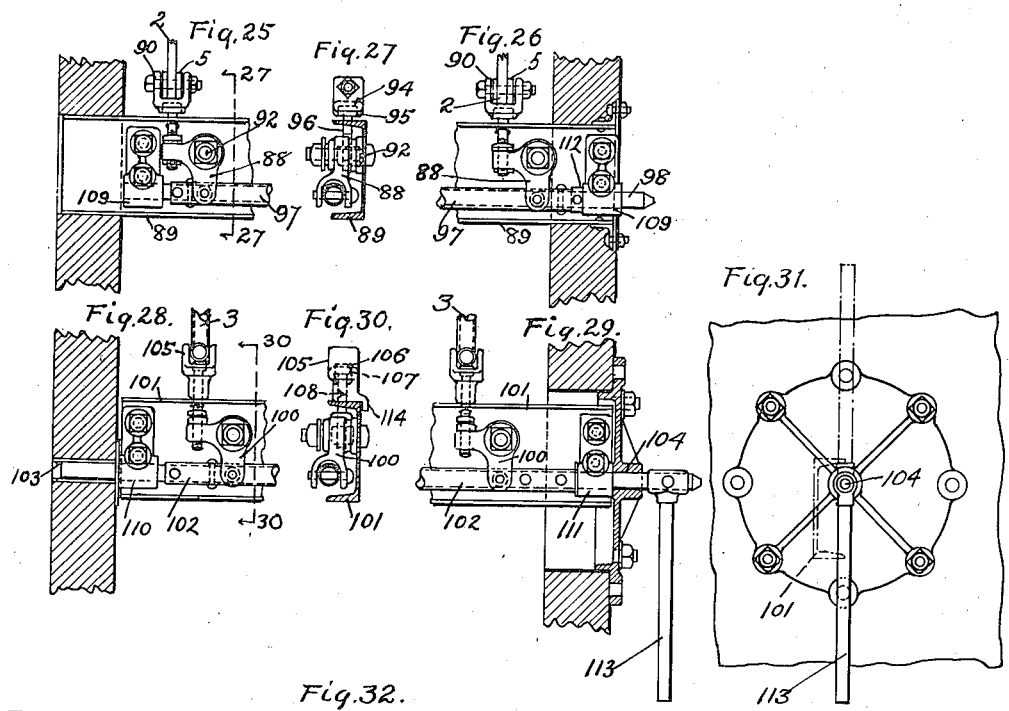
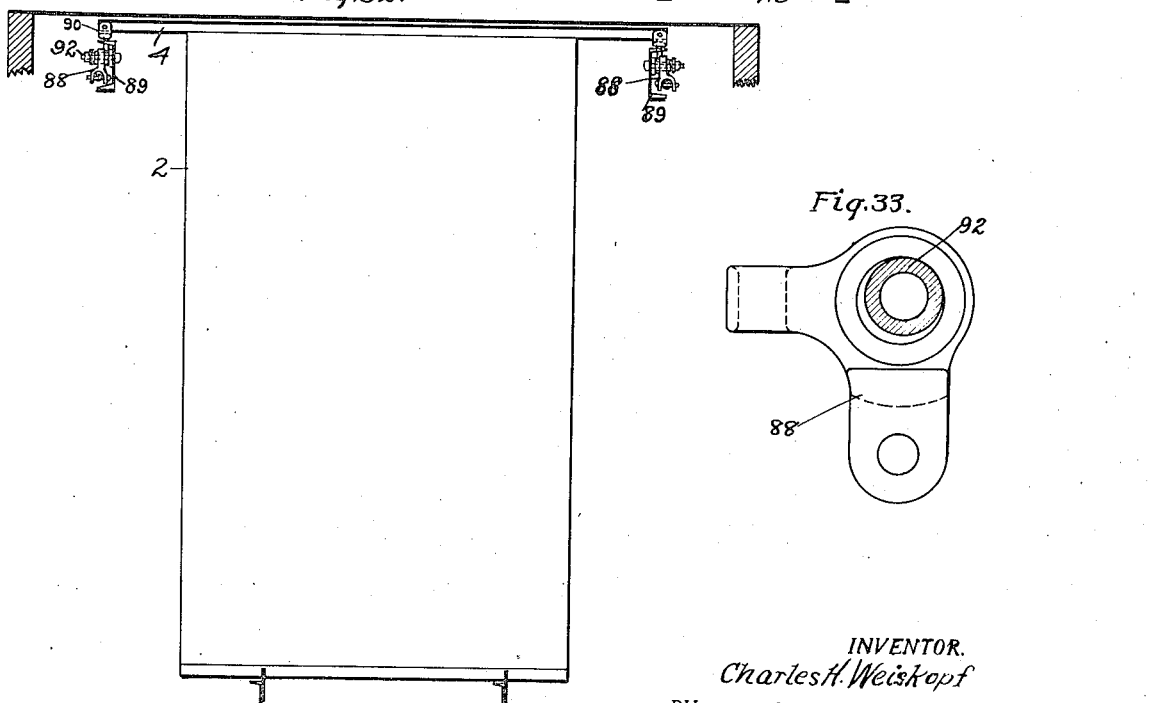
INVENTOR.
Charles H. Weiskopf
BY Arthur P. Knight
ATTORNEY.

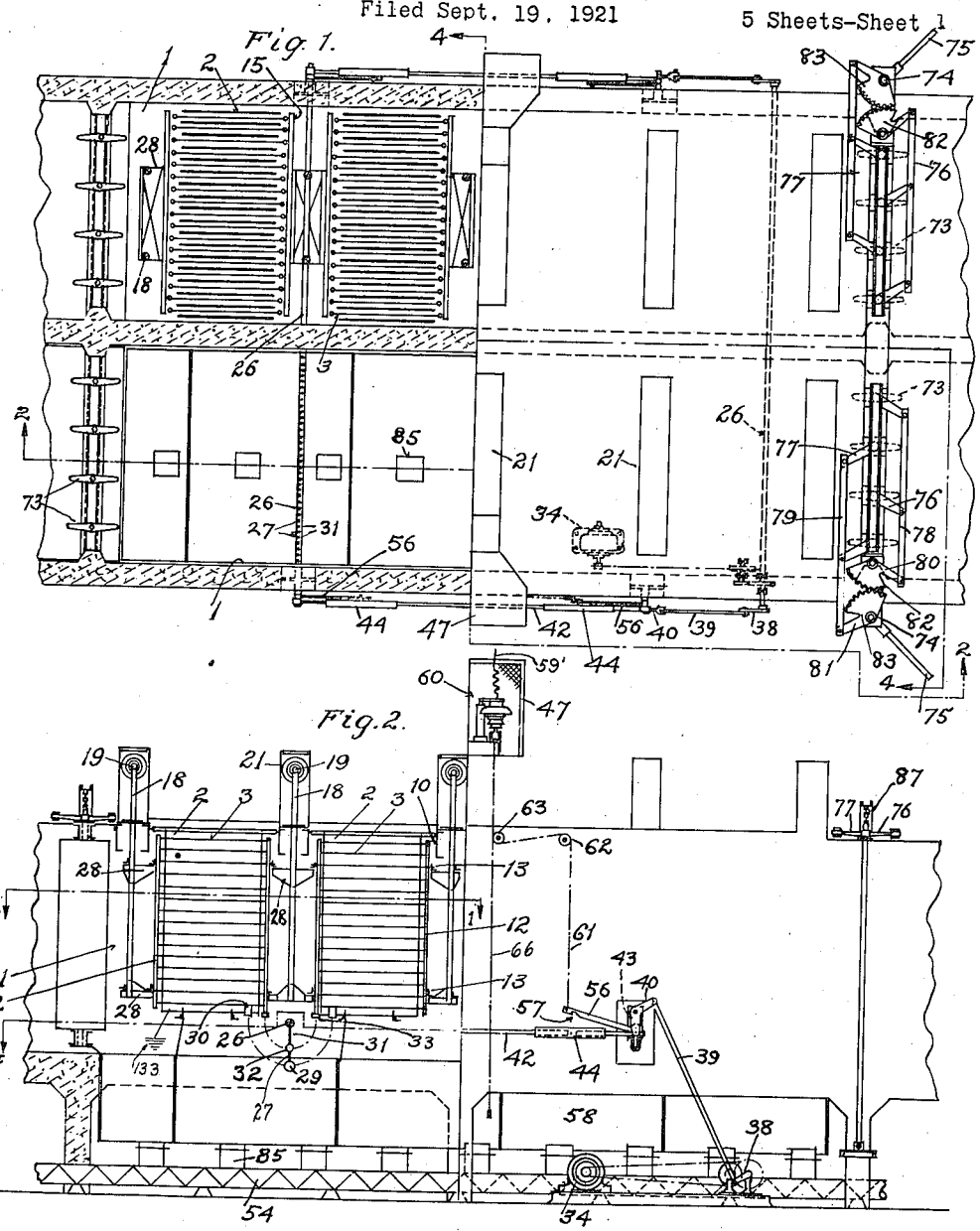

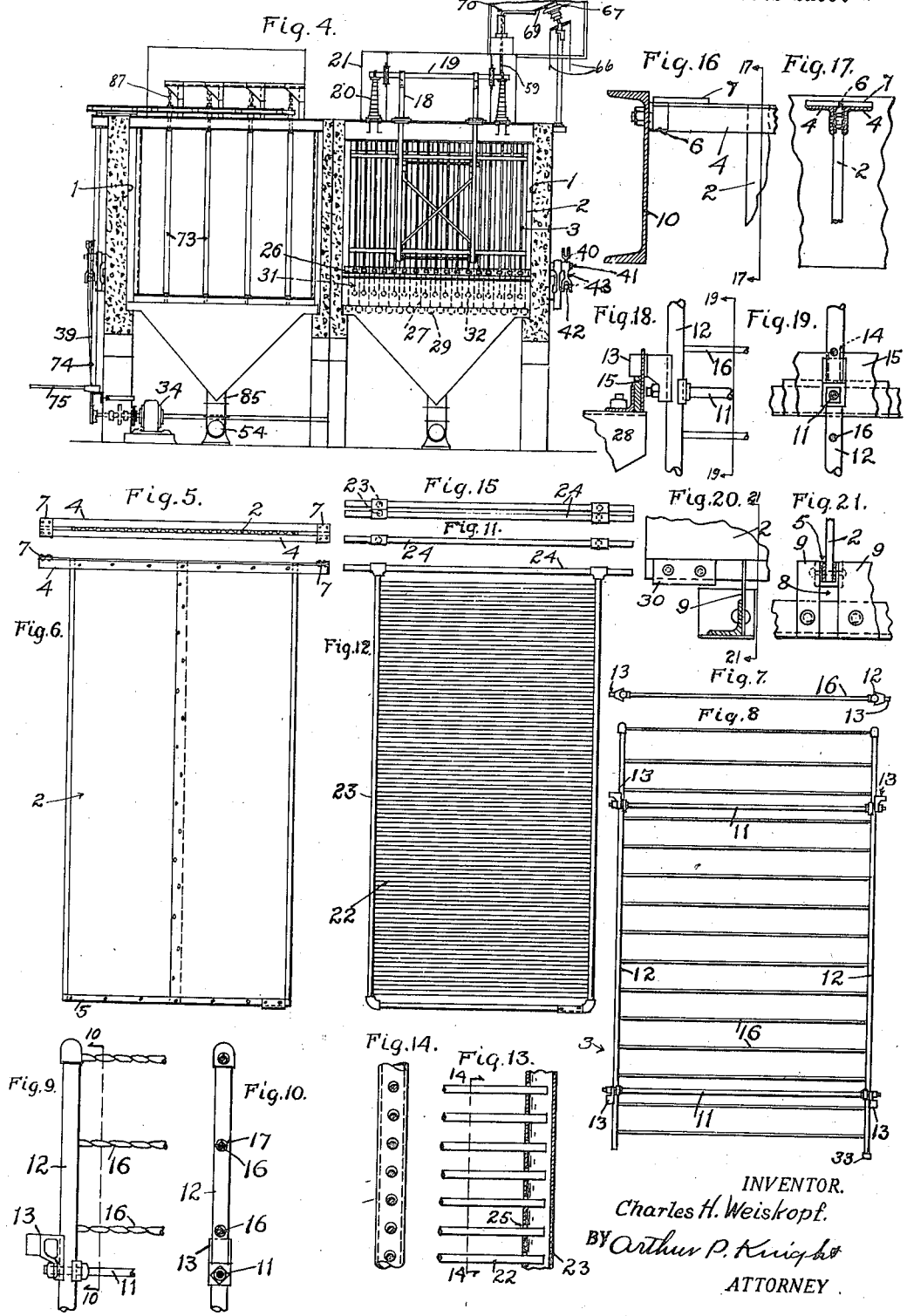

INVENTOR,
Charles H. Weiskopf
BY Arthur P. Knight
ATTORNEY.

Patented July 31, 1923.

1,463,352

UNITED STATES PATENT OFFICE.

CHARLES H. WEISKOPF, OF SANTA MONICA, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR THE ELECTRICAL PRECIPITATION OF SUSPENDED PARTICLES FROM GASES.

Application filed September 19, 1921. Serial No. 501,840.

*To all whom it may concern:*

Be it known that I, CHARLES H. WEISKOPF, a citizen of the United States, residing at Santa Monica, in the county of Los Angeles and State of California, have invented a new and useful Apparatus for the Electrical Precipitation of Suspended Particles from Gases, of which the following is a specification.

This invention relates to the precipitation of suspended particles from gases by electrical action, and the main object of the present invention is to provide an electrical precipitator with simple and effective means for removing the precipitated material from the electrodes thereof.

Another object of the invention is to provide an electrical precipitator with electrodes of a construction adapted to facilitate assemblage and replacement thereof.

A further object of the invention is to provide electrical precipitator electrodes of such construction as to facilitate dislodgment of the precipitated material therefrom.

Another object of the invention is to provide an electrical precipitator especially adapted for treatment of hot gases.

A further object of the invention is to provide a precipitator electrode system of unit construction so that the number of units may be varied at will.

The accompanying drawings illustrate embodiments of my invention, and referring thereto:

Fig. 1 is a plan view of one form of electrical precipitator embodied in my invention, partly in section on line 1—1 and partly in section on line 1ª—1ª in Fig. 2;

Fig. 2 is a side elevation, partly in section, on line 2—2 in Fig. 1;

Fig. 3 is a horizontal section showing the damper means for shutting off the flow of gas through the electrical precipitator during the cleaning operation;

Fig. 4 is a transverse section on line 4—4 in Fig. 1;

Fig. 5 is a plan view of one of the collecting electrodes of the precipitator in which the collecting electrode comprises corrugated metal plates, and in which the cleaning of the electrodes is effected by rapping;

Fig. 6 is a side elevation thereof;

Fig. 7 is a plan view;

Fig. 8 is a side elevation of one of the discharge electrodes of the precipitator;

Fig. 9 is a partial side elevation of such discharge electrodes on an enlarged scale;

Fig. 10 is a section on line 10—10 in Fig. 9;

Fig. 11 is a plan view; and

Fig. 12 is a side elevation of the form of collecting electrodes comprising loosely mounted parallel bars;

Fig. 13 is a vertical section of a portion of the form of collecting electrode shown in Figs. 11 and 12;

Fig. 14 is a vertical section on line 14—14 in Fig. 13;

Fig. 15 is a plan view of a modified form of the collecting electrode shown in Figs. 11 and 12 in which the electrode comprises two parallel vertical elements spaced apart to form a space in which the deposited material may descend;

Fig. 16 is a detail vertical section showing the supporting means for the collecting electrode;

Fig. 17 is a section on line 17—17 in Fig. 16;

Fig. 18 is a detail vertical section of the supporting means for the discharge electrodes;

Fig. 19 is a section on line 19—19 in Fig. 18;

Fig. 20 is a partial section of the retaining means at the bottom of the collecting electrode;

Fig. 21 is a section on line 21—21 in Fig. 20;

Fig. 22 is a plan view of the operating means for rapping the electrical precipitator shown in Figs. 1 to 4, a portion of the supporting frame being shown in section;

Fig. 23 is a side elevation of the mechanism shown in Fig. 22;

Fig. 24 is an end elevation thereof;

Fig. 25 and Fig. 26 are partial side elevations of portions of a modified form of rapping means for the electrical precipitator;

Fig. 27 is a section on line 27—27 in Fig. 25;

Figs. 28 and 29 are side elevations showing the application of this form of my invention to jarring or rapping the discharge electrodes;

Fig. 30 is a section on line 30—30 in Fig. 28;

Fig. 31 is an end elevation of the mechanism shown in Fig. 29;

Fig. 32 is a side elevation of a collecting electrode construction provided with the rapping means shown in Figs. 25 to 27.

Fig. 33 is a side elevation of one of the bell-crank levers used in transmitting the rapping blow in the form of my invention shown in Figs. 25 to 32, the supporting shaft therefor being shown in section;

Fig. 34 is a partial elevation showing the electrode supports for a form of electrical precipitator embodying my invention in which the cleaning of the electrodes is effected by lifting and dropping the same;

Fig. 35 is a side elevation of the construction shown in Fig. 34, a portion of the precipitator wall being shown in section;

Figure 36:
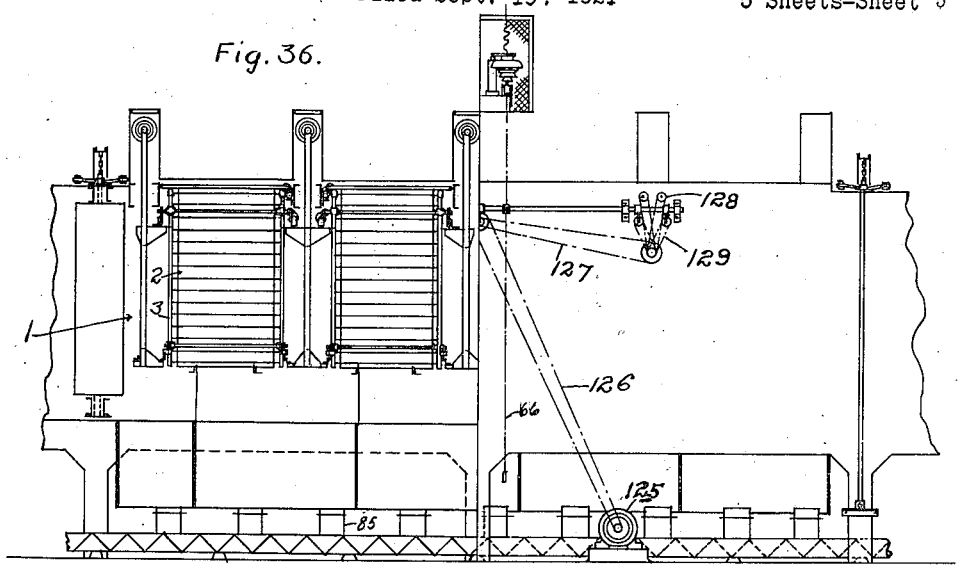
Fig. 36 is a partly sectional side elevation of an electrical precipitator provided with means for operating the electrode lifting means, such as shown in Figs. 34 and 35, and applicable also in connection with electrode lifting means, such as shown in Figs. 37 and 38.

The electrical precipitator shown in Figs. 1 to 4 comprises one or more flues or chambers 1 adapted to receive and conduct the gas to be treated and having mounted therein the electrodes for effecting electrical action on the gases to precipitate suspended material therefrom; said electrodes comprising collecting electrodes 2 and discharge electrodes 3. The collecting electrodes 2 preferably comprise plates, screens, or similar means extending longitudinally in the flue and parallel to the path of the gases passing through said flue, a plurality of such members being arranged in a row extending across the flue or chamber 1. The discharge electrodes 3 extend vertically between the successive collecting electrodes.

Each collecting electrode 2 may, as shown in Figs. 5 and 6, consist of a corrugated vertical plate hung from top bars 4 and having a reenforcing bar 5 at its lower edge. The electrode constituted by the parts 2, 4 and 5 is preferably loosely mounted to enable vertical vibration or movement thereof, this being effected, for example, by providing each electrode with a cross-plate 7 at each end (see Figs. 16 and 17) rigidly secured to the top bars 4 of the electrode and resting on lugs 6 on supporting beams 10, said bars 4 embracing said lugs 6, so that the weight of the electrode rests by means of said cross-plate on said lugs 6 but the electrode can move freely upward. The lower bars 5 of the electrode pass loosely through notches 8 in a fixed spacing plate 9 (see Figs. 20 and 21) to hold the electrodes from lateral displacement while permitting rattling motion thereof.

Each discharge electrode may consist of a vertical frame consisting of cross-bars 11 and side bars 12, having lugs 13 resting loosely in notches 14 on upper and lower supporting beams 15 at each end of the frame, so as to permit free upward movement and rattling movement of the electrodes. Any suitable discharge electrode elements may be mounted on said frame. I prefer, however, to use bars or rods 16 loosely mounted in holes or openings 17 in the said frame bars 12, so as to provide for a certain amount of lost motion or rattling of said electrode members in said frame. The said discharge electrode members 16 may consist of metal rods of any suitable cross-section, for example, they may be square rods twisted, as shown in Figs. 9 and 10, but in any case the said discharge electrode members are spaced sufficiently far apart to enable each of said electrode members to produce its own individual field without undue interference from the adjacent discharge electrode members. The discharge electrode supporting beams 15 are mounted on brackets 28 which may be hung by bars 18 from beams 19 resting on insulators 20, which may be mounted in suitable housings 21 above the flue or chamber 1.

A similar construction to that above described for the discharge electrode members may also be adopted for the collecting electrode members, the electrode members being, however, in that case spaced close together so as to give substantially the effect of a continuous surface with respect to the electrical field produced. Such a construction is shown in Figs. 11 to 14, wherein the collecting electrode members are formed as rods or bars 22 mounted in parallelism and in sufficiently close juxtaposition and mounted in side bars 23 of a supporting frame, said side bars having holes or openings 25 loosely receiving said collecting electrode members 22 and the said collecting electrode frame having a top bar 24 supported as above described, so as to provide for vertical freedom of movement of the electrode in an upward direction.

As shown in Figs. 13 and 14, the side bars of the electrode frame may be formed as tubes having the openings on the inside thereof, the outer sides being closed so as to serve as stops against longitudinal movement and disengagement of the electrode elements 22 from the frame.

If desired, the collecting electrodes may, as shown in Fig. 15, comprise parallel electrode members of a construction such as shown in Fig. 12, and extending side by side, the intervening space serving as a pocket for receiving deposited material.

From the above described construction it may be seen that each of the collecting electrodes, as well as each of the discharge electrodes, is independently and loosely mounted on the supporting means therefor, so that it can be placed in position or withdrawn for repair or renewal with minimum trouble and delay. This loose mounting of the electrodes is also of advantage in cleaning the same as it enables the electrodes to vibrate under the influence of the jarring operation more freely and effectively than would be the case with electrodes rigidly mounted. By reason of the loose mounting of the electrodes in the manner described any jar imparted to the electrodes, by hand, or otherwise, for cleaning the same, causes in the first place a slight displacement of the electrode frame on its support, the electrode frame moving bodily relatively to its support so that the jarring action is concentrated in the electrode system and is communicated in but slight degree to the support; and, in the second place, such jarring action causes the electrode elements loosely mounted on the electrode member to vibrate relatively to the frame, so as to produce a more effective jarring action tending to remove precipitated material from the electrode members.

In order to produce a more effective rapping action on the electrodes I prefer to provide mechanical means for that purpose. For example, as shown in Figs. 1 to 4, hammer means may be provided for imparting vertical blows to the lower ends of the respective electrodes, said hammer means being mounted on shafts 26 extending transversely through the flues 1 below the sets of electrodes in such position that the hammer means carried by said shafts will strike the lower ends of the respective electrodes when the said hammer means are swung to one side. In general it is desirable to provide a series of sets or rows of electrodes in the flue carrying the gases so as to provide for a series or succession of electrical precipitating actions on the gas as it passes through the flue and the hammer means, as indicated, are advantageously located between the successive rows of electrodes so that each hammer means is adapted to operate upon two sets or rows of electrodes, namely, the one directly in advance of same and the one directly following the same. For the sake of simplicity the same shaft 26 is preferably made to carry hammer means for cooperating with both the collecting and discharge electrodes, said shaft being provided with relatively long hammer bars 27 extending therefrom and carrying balls 29 adapted to strike anvils 30 on the bottom of the respective collecting electrodes (see Fig. 20) and with relatively short hammer bars 31 extending from the shaft and carrying balls 32 adapted to strike anvils 33 on the lower ends of the high tension discharge electrode frame bars 12 (see Fig. 8). The hammer shafts 26 may be operated by hand if so desired; in an installation of any considerable size, however, it is desirable to provide for operating the hammers automatically and for this purpose the respective hammer shafts 26 may be connected to be operated by a motor 34 through suitable mechanism, such as indicated in Figs. 1 and 2 and illustrated more fully in Figs. 22 to 24. Said motor operates through suitable gearing or driving connections, indicated at 36, to rotate a shaft 37 carrying a crank 38 to which is connected a link 39 having a pivotal connection to an oscillating lever arm 40 pivotally mounted on a fixed bearing 41. A bar or reciprocating member 42 extends alongside the electrical precipitator and is supported by pivoted arms 43 in such manner as to enable the bar 42 to reciprocate horizontally, one of said arms 43 being rigidly connected to oscillating lever arm 40 so that said bar is continually reciprocating and constitutes a common operating means for all of the rapping devices adjacent to each of such rapping devices. Said bar is provided with a tubular portion 44 in which a slide member 45 is mounted between two springs 46, said slide member having a stud 48 which projects through a slot 49 in one side of said tubular portion 44. An arm 50 pivotally mounted at 41 on a fixed support is provided with a slotted portion 52 engaging a stud 53 on an arm 55 carried by the shaft 26 aforesaid and a link 56 is pivotally connected to arm 50 and provided with a notch 57 adapted to engage the projecting stud 48 aforesaid, so as to cause the arm 50 to be oscillated by connection with said stud. The horizontal reciprocation of bar 42 may proceed continually under operation of motor 34 and the driving connections 36, 37, 38, 39 and 40 but the rapping devices are normally inoperative, the links 56 being lifted out of engagement with the corresponding studs 48. When any one of the rapping devices is to be operated, the corresponding link 56 is dropped onto the stud 48 and in the reciprocation of such stud it will enter the notch in said link and thereby couple the operating means to the rapping device. In the following stroke of the member 42 it will operate through one of the cushion springs 46, stud 48 and link 56 to swing the arm 50 and through the operation of the arm 55 will rock the shaft 26 and cause the hammer devices thereon to swing to one side. Then, as the bar 42 returns, it will act through the other spring 46 to swing the hammer in the opposite direction and, in the subsequent reciprocation of bar 42, the amplitude of oscillation of the hammer devices increases until eventually they are caused to strike the anvil means on the respective electrodes. The elastic connection between the operating bar 42 and the hammer mechanism by means of the springs 46 aforesaid enables the hammer means to swing in the manner of a pendulum, requiring the application of comparatively little force to maintain the swinging motion once it is started and said elastic connection also enables the hammer means to be started in operation with the minimum of jar on the driving connections.

Figure 39:
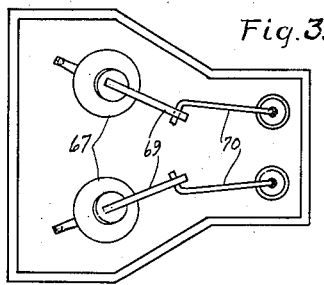
Fig. 39 is a plan view.
Figure 40:
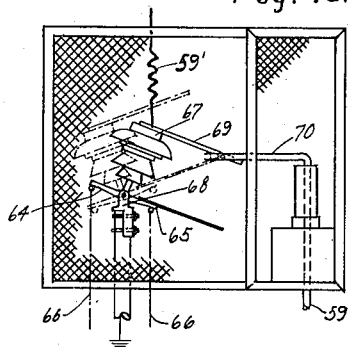
Fig. 40 is a side elevation of an electrical switch means suitable for employment in connection with the electrical precipitator constituting my invention for breaking the electrical energizing circuit of the precipitator during the cleaning operation.

It is desirable to provide for shutting off the current from the electrical precipitator during the cleaning operation and for this purpose an electric switch 60 is included in the connection 59 leading from the high tension discharge electrode system above described to any suitable source of high tension direct current in the manner usual in this art, said switch may be enclosed in a suitable housing 47. In order to ensure operation of this switch so as to open circuit any particular section of the treater when same is being cleaned I prefer to provide a connection from the coupling means consisting of the notched link 56 to the said switch, said connection comprising, for example, a cable 61 connected to said link and running over sheaves 62 and 63 and connected to an arm 64 on said switch. Another arm 65 on said switch may be connected to a pull-chain or cable 66 for returning the switch to closed position. As shown in Figs. 39 and 40, said switch may comprise insulator 67 mounted rigidly with the arms 64 and 65 on a pivot 68 and carrying current closing arm 69 which is adapted to contact with a fixed conductor 70, connected to conductor 59 leading to the frame bar 19, said circuit closing arm 69 being connected by flexible conductor 59' leading to the source of high electric potential. It will be understood, however, that any other suitable form of switch may be used.

It is also desirable to shut off, or at least reduce, the gas flow during the cleaning operation of the treater, this being effected, for example, by louvre dampers 73 mounted at the inlet and outlet ends of each flue 1, each set of louvre dampers being operated in unison by operating means, such, for example, as shown in Fig. 1. In order to obtain tighter closure of the louvre dampers, it is preferable to hang the louvre members 73 by chains 87 from a fixed support and to provide for turning alternate louvres or damper members oppositely, this being effected by connecting arms 76 and 77 on alternate damper shafts respectively to two operating bars 78 and 79 which are connected to arms 80 and 81 on intermeshing segment gears 82 and 83, the shaft 74 of one of said gears being operated by a handle 75. By this means the adjacent damper members 73 may be caused to swing into contact at their edges, and in order to ensure a more effective closure at such edges the damper members may be provided at their edges with interengaging flange portions 84 and 86, respectively concave and convex in shape and so positioned that in the closing of the damper members the convex flange 86 will ride onto and seat within the concave flange 84.

Suitable means, such as bins or hoppers 58, may be provided at the bottom of the flue or flues 1 to receive the precipitated material when it is dislodged from the electrodes of the precipitator and means, such as a screw conveyor 54, may be provided at the bottom 85 of the said bins for carrying away the material collected therein.

The operation of the form of my invention above described is as follows:

The gas to be treated, which may be gas coming from furnaces, kilns, smelters, or the like, and containing dust, fume, smoke, or other suspended material, is conducted through the flue or flues 1, the louvre dampers described being adjusted to properly control the gas flow as to velocity and distribution. In passing between the successive sets or rows of collecting and discharge electrodes 2 and 3 the gas is subjected to electrical action in such manner as to cause electrical precipitation of suspended material on such electrodes. While the greater portion of the material so precipitated collects on the so-called collecting electrodes, there is also, in general, some material collected on the discharge electrodes. In order to dislodge and remove such precipitated material from both the collecting and discharge electrodes the cleaning means above described is operated from time to time to rap or jar the electrodes. This may be effected for any two adjacent sections of the precipitator by lowering the coupling means 56 corresponding to such sections of the precipitator into engagement with its corresponding stud 48 with the result that the reciprocating motion of the operating bar 42 is communicated through such stud to said link, and the hammers are thereby caused to swing from side to side so as to alternately strike the collecting and discharge electrodes of the two adjacent rows or sets of electrodes. During this operation, the electric energizing connection to the high tension or discharge electrodes of such sections is interrupted by the operation of the switch 60 through its connections above described with the coupling means 56. When the cleaning operation on one unit has been completed in this manner the corresponding coupling means 56 is raised, disengaging the operating means from the hammer devices, the operating then restoring the electric switch 60 to operative position by means of pull-chain 66.

Any other suitable means may be employed for rapping the electrodes, for example, for rapping the collecting electrodes I may employ the means shown in Figs. 25 to 27, said means comprising bell-cranks 88 pivotally mounted on a cross-beam 89 and supporting by their horizontal arms saddles 90 on which rest supporting bars 95 for the collecting electrodes. In the form shown in Figs. 25 to 27 such supporting bars are indicated as the bottom bars of the collecting electrodes 2, but, as shown in Fig. 32, such saddles 90 may support the top bar 4 of the collecting electrodes 2. The support of the electrode on the saddles 90 is such as to permit of free vertical upward movement of the electrode with respect to its support, for example, as shown in Figs. 25 to 27, said saddle may be provided with a socket 94 fitting loosely over a head 95 on a bolt 96 secured to the horizontal arm of the bell-crank 88, a bell-crank or lever 88 with its associated saddle 90 will be provided at each end of each collecting electrode, the several bell-cranks 88 at each end of the row of collecting electrodes being connected to operate in unison by a rod 97 pivotally connected to all of said bell-cranks. Said rod is slidably mounted in bearings 109 and projects at one end beyond the side of the casing, as indicated at 98, to form an anvil for receiving a blow from a hammer, such as a manually operated hammer, or a pneumatic hammer. A collar 112 on bar 97 engages with one of the bearings 109 to normally sustain the weight of the electrodes. At each operation of such hammer means the blow delivered to the bar 97 is imparted through bell-cranks 88 to the several saddles 90 and causes an upward blow to be delivered to each collecting electrode, the mounting of such electrodes being such that they are free to move upwardly under the impact thus delivered (by reason of the loose connection between parts 94 and 95) with the result that the electrodes are given a jumping and rattling jar which is more effective in removing the deposit than would be the case with a rigidly mounted electrode. In order to further conduce to looseness of the support of the parts and to permit of accommodation of the bell-cranks to unavoidable irregularities and non-conformity of the co-acting parts, the bell-cranks are preferably mounted loosely on pivot shafts 92, as indicated in Fig. 33.

In Figs. 28 to 30 I have illustrated a similar rapping means for the discharge electrodes. In this case, however, the bell-cranks, indicated at 100, are pivotally mounted on a beam 101 which is carried by a shaft 102 mounted in bearings 103 and 104 in the sides of the precipitator chamber. The discharge electrodes 3 rest in saddles 105, which are provided with sockets 106 loosely engaging heads 107 on pins 108 carried by the respective bell-cranks 100. The shaft 102 is longitudinally movable within the bearings 103 and 104 and also in bearings 110 and 111 on the beam 101 so that a blow imparted to said shaft by the manually or pneumatically operated means is transmitted through the bell-cranks 100 and saddles 105 to the respective discharge electrodes. A handle 113 on the shaft 102 enables said shaft to be turned (as shown in full lines in Fig. 31) so as to swing the beam 101 and the bell-cranks and saddles carried thereby downwardly away from the discharge electrodes so as to be sufficiently removed from same on the normal operation of the precipitator to prevent discharge passing from said electrodes to the said parts. When the hammering operation is to be performed current is cut off from the discharge electrodes, as above described, and the handle 113 is then manipulated to the position shown in broken lines in Fig. 31 so as to bring the beam 101 to upright position with the saddles 105 under and in engagement with the discharge electrode. Saddles 105 then rest on top of beam 101 to support the electrodes, and are prevented from turning by shoulders 114 thereon engaging said beam.

As a modification of the operation I may provide for raising the electrodes bodily and dropping them, means for this purpose being indicated in Figs. 34 to 38. In this case, the collecting electrodes 2 rest by their top bars 4 on cam bars 115 formed, for example, as square rods, which are mounted to turn in bearing 116 so as to intermittently raise the collecting elctrodes. Similarly, the discharge electrodes 3 are mounted to rest on cams or square bars 117 mounted to turn in bearings 118. In each of these cases the mounting of the electrodes is such as to permit a free upward movement thereof so that the full jarring effect of the vertical impact due to the sudden arrest of the downward movement is secured, the electrodes rebounding slightly on such impact so as to rattle or vibrate on or within their supports. The operating shafts 115 are provided with operating gears 120 operated by chains, or otherwise, from any suitable motive device. For operating the lifting shaft 117 for the discharge electrodes a separate shaft 121 may be provided mounted to turn in a suitable fixed bearing and slightly endwise therein, so as to bring a clutch member 122 thereon into engagement with the clutch member 123 on the lifting shaft 117. The several shafts 115 and 121 aforesaid may be operated from an electric motor 125 through belt or chain connections 126, 127, 128 and 129, indicated in broken lines in Figs. 36 and 38. The construction of an electrical precipitator may be otherwise the same as above described in Figs. 1 to 4.

Figure 37:
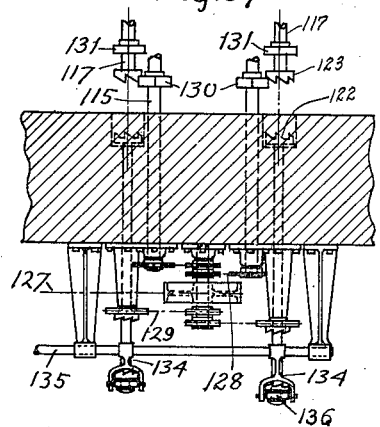
Fig. 37 is a plan view of the operating means shown in Fig. 36, a portion of the precipitator frame being shown in section, and a modified form of electrode lifting means being shown.
Figure 38:
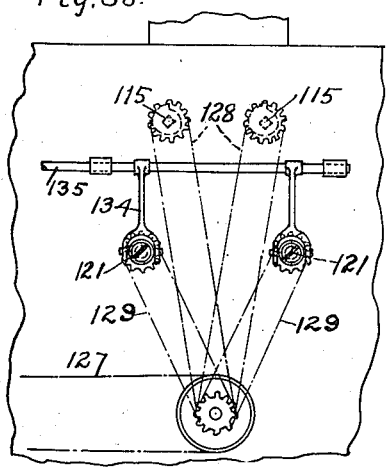
Fig. 38 is a side elevation of the mechanism shown in Fig. 37.

Instead of the square shafts for lifting and dropping the electrodes, I may use cams, as indicated in Figs. 37 and 38 at 130 and 131, rigidly mounted on shafts 115 and 117 for lifting the collecting electrodes and the discharge electrodes, respectively, the construction being otherwise as above described in connection with Figs. 34 to 36.

For control of the operating mechanism shown in Figs. 36 to 38, I may provide a rock shaft 135 manually operated in any suitable manner, for example, by connection to the switch pull-cord 66 aforesaid for controlling the current to the electrical precipitator, said rock shaft carrying levers 134 to which are pivoted collars 136 engaging with the respective shafts 121 in such manner that rocking of the shaft 135 by operation of the pull-cord 66 will cause the shafts 121 to move longitudinally so as to bring clutches 122 thereon into clutch with clutch members 123 on the shafts 117, the effect of this operation being to simultaneously open the energizing circuit to the electrical precipitator section and to mechanically connect the operating shafts 121 to the lifting shafts 117.

It will be understood that in each of the above described forms of my invention the high tension discharge electrodes are connected to suitable energizing means for supplying the same with rectified current of high potential, such current, for example, being supplied from a suitable alternating current source through a step-up transformer and rectified by a mechanical rectifier in a manner disclosed in patent to F. G. Cottrell—No. 895,729. August 11th, 1908—the high tension disharge system above described being connected to such rectifier and the collecting eletrode system being grounded in the usual manner, as indicated at 133 in Fig. 2.

By reason of the loose support of the several collecting and discharge electrodes of each section of the precipitator the objectionable effects of the high temperature due to warping and expansion are minimized, the described construction being, therefore, especially advantageous in the treatment of gases at high temperature.

The described construction is also especially advantageous in that the electrode units being hung independently on their supporting beams can be added to or varied in number at will at minimum expense of time, labor and cost.

What I claim is:

1. In an electrical precipitator, a vertical electrode, supporting means provided with means for engaging said electrode to support the same while permitting free upward movement of said electrode relative to the support, and means for jarring said electrode to produce such upward movement.

2. In an electrical precipitator, a gas conducting chamber, supporting means mounted therein, vertical electrodes resting loosely on said supporting means to enable free upward movement of said electrodes, and means for imparting a vertical blow to said electrodes.

3. In an electrical precipitator, the combination of a gas conducting chamber, electrode supporting means therein, a vertical collecting electrode loosely mounted on said supporting means so as to be capable of free upward movement, and means for upwardly jarring said electrode.

4. In an electrical precipitator, a gas conducting chamber, insulators mounted adjacent thereto, a frame carried by said insulators and vertical discharge electrodes loosely mounted on said frame so as to be capable of free upward vertical movement when subjected to vertical jarring action, and means for upwardly jarring the frame.

5. In an electric precipitator, a collecting electrode comprising a frame supported in a vertical plane, a plurality of parallel horizontal bars loosely mounted in the frame for free upward movement relatively thereto and means for upwardly jarring the frame.

6. In an electric precipitator, a collecting electrode comprising a frame supported in a vertical position so as to be freely movable in upward direction, a plurality of parallel horizontal bars loosely mounted in the frame for free upward movement relatively thereto and means for upwardly jarring the frame.

7. In an electric precipitator, a discharge electrode comprising a frame supported in a vertical position so as to be freely movable in upward direction, a plurality of parallel horizontal bars loosely mounted in the frame for free upward movement relatively thereto and means for upwardly jarring the frame.

8. In an electrical precipitator, a gas conducting chamber provided with electrode supports, a plurality of parallel vertical collecting electrodes loosely mounted on said supports so as to be capable of free upward vertical movement and means for imparting a vertical blow to all of said collecting electrodes.

9. In an electrical precipitator, a gas conducting chamber, insulators mounted adjacent thereto, a frame mounted on said insulators, a plurality of vertically extending discharge electrodes loosely mounted on said frame so as to be capable of free upward movement and means for imparting a vertical jar to all of said discharge electrodes.

10. An electrical precipitator comprising a gas conducting chamber, a plurality of parallel vertical collecting electrodes extending therein, a plurality of parallel vertical discharge electrodes extending between and in alternation with said collecting electrodes, supporting means provided with means for loosely supporting said collecting electrodes to permit of free upward vertical movement thereof, insulated supporting means provided with means for loosely supporting said discharge electrodes to permit of free upward movement thereof.

11. An apparatus, as set forth in claim 7, and comprising, in addition, a rock shaft and hammer means carried by said shaft and adapted to strike the respective collecting electrodes in the rocking movement of said shaft, and hammer means also carried by said shaft and adapted to strike and impart a vertical blow to the discharge electrodes in the rocking movement of said shaft.

12. In an electrical precipitator, a plurality of sets of electrodes, hammer devices for jarring the electrodes of the respective sets, a reciprocating member mounted to move adjacent to said sets of electrodes and a disengageable coupling between said reciprocating member and said hammer devices whereby any one or more of said hammer devices may be operated from said reciprocating member through said disengageable coupling.

13. An electrical precipitator comprising a gas receiving chamber containing a plurality of sets of electrodes, including collecting electrodes and discharge electrodes, hammer devices for jarring the electrodes of the respective sets, a reciprocating member mounted to move adjacent to said hammer devices and means for disengageably coupling said reciprocating member to any one of said hammer devices, means for operating said reciprocating member and a switch controlling an energizing connection to the discharge electrodes of each set, said switch being connected to the said disengageable coupling corresponding to said set of electrodes so as to break the circuit to such set when the hammer means therefor is coupled to said reciprocating member.

14. In an electrical precipitator, an electrode, a jarring device therefor comprising a rock shaft carrying a hammer member adapted to strike and jar said electrode in the rocking movement of such shaft, a reciprocating operating member and motive means connected to drive the same, a member elastically mounted on such reciprocating operating member and a coupling member adapted for disengageable connection with said last named member and connected to said rock shaft to cause rocking of said shaft by operation of said reciprocating member through said elastically mounted member when said coupling member is in coupled position.

15. In an electrical precipitator, electrode means and means for jarring the same, comprising a rock shaft provided with hammer means adapted to strike the electrode means, a reciprocating member, means for operating the same, and a disengageable elastic connection between said reciprocating member and said rock shaft to cause operation of the rock shaft by reciprocation of said reciprocating means.

In testimony whereof I have hereunto subscribed my name this 13th day of September, 1921.

CHARLES H. WEISKOPF.